United States Patent
Lortie

(10) Patent No.: US 9,422,960 B2
(45) Date of Patent: Aug. 23, 2016

(54) SUPPORT BRACKET AND ASSEMBLY FORMED OF CONNECTED STRUCTURAL MEMBERS

(71) Applicant: Lortie Designs, Inc., Middleborough, MA (US)

(72) Inventor: Gabriel Lortie, Middleborough, MA (US)

(73) Assignee: Lortie Designs, Inc., Middleborough, MA (US)

( * ) Notice: Subject to any disclaimer, the term of this patent is extended or adjusted under 35 U.S.C. 154(b) by 30 days.

(21) Appl. No.: 14/297,315

(22) Filed: Jun. 5, 2014

(65) Prior Publication Data

US 2015/0260335 A1 Sep. 17, 2015

Related U.S. Application Data

(60) Provisional application No. 61/952,285, filed on Mar. 13, 2014.

(51) Int. Cl.
| | |
|---|---|
| A47B 96/00 | (2006.01) |
| F16B 12/12 | (2006.01) |
| A47B 57/10 | (2006.01) |
| A47B 96/06 | (2006.01) |
| F16B 12/20 | (2006.01) |
| F16B 12/32 | (2006.01) |

(52) U.S. Cl.
CPC ............... *F16B 12/12* (2013.01); *A47B 57/10* (2013.01); *A47B 96/06* (2013.01); *F16B 12/20* (2013.01); *F16B 12/32* (2013.01)

(58) Field of Classification Search
CPC .... A47B 57/42; A47B 57/40; A47B 47/022; F16M 13/022; F16M 12/12; F16M 12/28
USPC ............................................ 248/243, 223.41
See application file for complete search history.

(56) References Cited

U.S. PATENT DOCUMENTS

| | | | | |
|---|---|---|---|---|
| 2,933,196 A | * | 4/1960 | Childs ................... | A47B 57/42 211/183 |
| 3,888,440 A | * | 6/1975 | Rebentisch ............ | H02G 3/263 248/222.13 |
| 4,154,419 A | * | 5/1979 | Breidenbach ........ | A47B 57/402 108/110 |
| 4,189,123 A | * | 2/1980 | Johnson ................. | A47B 96/14 108/108 |
| 4,378,925 A | | 4/1983 | Griffin | |
| 4,429,850 A | * | 2/1984 | Weber ................... | A47F 5/0846 108/108 |
| 5,082,388 A | * | 1/1992 | Lauterbach ............ | A47B 57/40 403/231 |
| 5,318,264 A | * | 6/1994 | Meiste ................... | A47B 57/56 108/108 |
| 5,725,110 A | * | 3/1998 | Kluge ................... | A47B 61/00 108/108 |
| 5,806,820 A | * | 9/1998 | Simon ...................... | F16L 3/24 211/192 |
| 6,024,333 A | * | 2/2000 | Raasch .................. | A47B 55/02 211/134 |
| 6,929,131 B1 | * | 8/2005 | Landi .................... | A47F 5/0846 211/87.01 |
| 7,874,708 B1 | | 1/2011 | Jones et al. | |
| 8,234,983 B2 | * | 8/2012 | Randolph ............ | A47B 47/022 108/108 |
| 2004/0112005 A1 | * | 6/2004 | Fischer ................... | B21D 5/08 52/749.1 |
| 2007/0110511 A1 | * | 5/2007 | Chen ...................... | A47B 57/40 403/230 |

* cited by examiner

*Primary Examiner* — Mark Wendell

(57) ABSTRACT

A structural support apparatus comprises a connection bracket comprising, a generally flat, rigid member having opposing generally flat faces and a thickness extending between the flat faces. The rigid member is attachable to a support member. An arm extends from an end of the rigid member and a finger extends from the arm and is receivable in a hollow channel formed in an attachable member of rigid material. The hollow channel is complementary in configuration to at least one of the finger and the arm and a selected recess configuration is formed between the finger, the arm and the end of the rigid member. The recess accommodates one or more lip portions of the attachable member when either the arm or the finger, are received within the hollow channel.

17 Claims, 9 Drawing Sheets

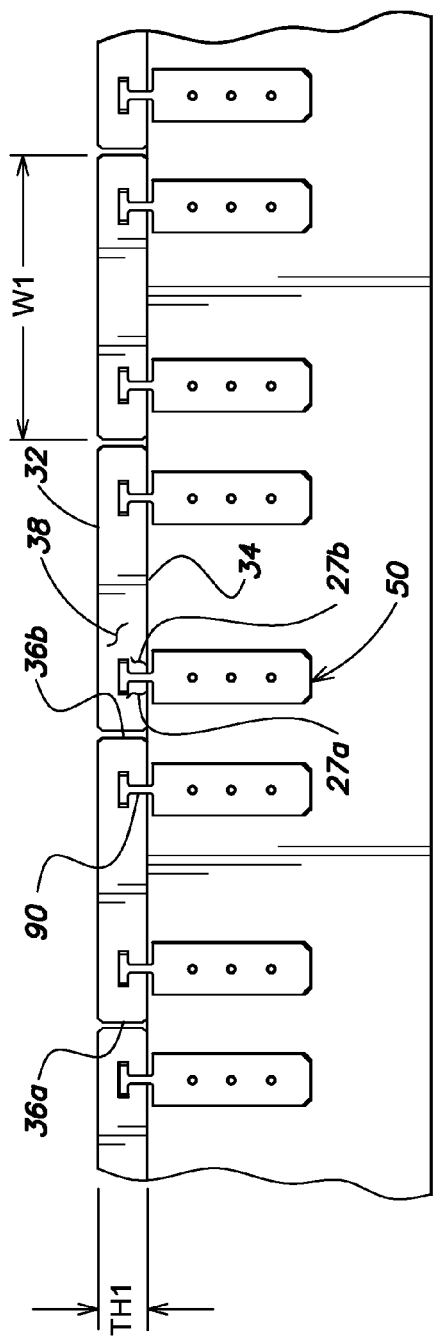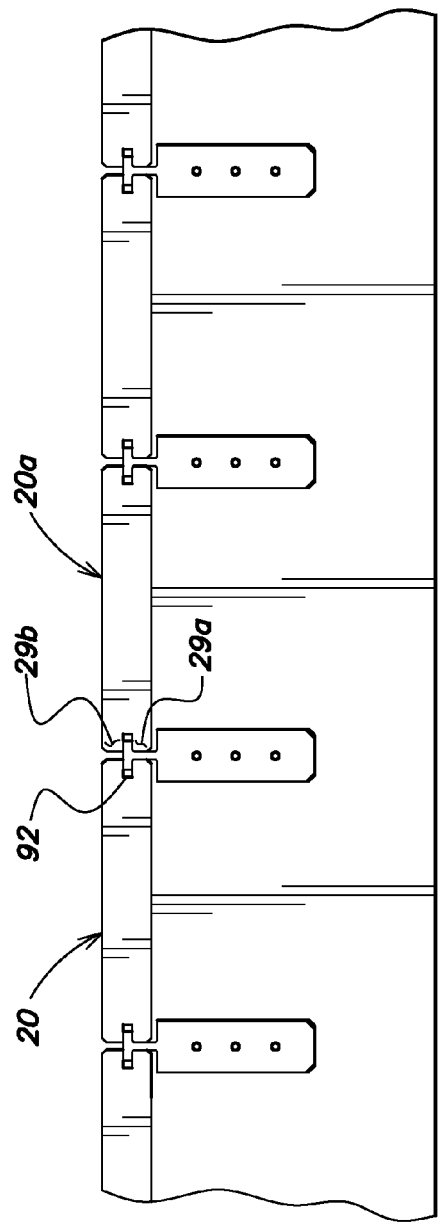

SUPPORT BRACKET AND ASSEMBLY FORMED OF CONNECTED STRUCTURAL MEMBERS

This is a non-provisional application claiming priority of provisional application Ser. No. 61/952,285 by Gabriel J. Lortie, filed 13 Mar. 2014.

TECHNICAL FIELD

A system concerns a bracket and assembly of wooden, composite, plastic, metal or other beams, planks, boards and their attachment, connection and support in the form of support structures.

BACKGROUND

The assembly of solid elongated wooden or plastic or carbon fiber planks or beams typically requires adapting the beams to include complex channels bored within the body of the beams and unsightly nails, tacks screws and the like inserted through the top surfaces of the beams in order to fasten or attach the beams to an underside set of support beams.

SUMMARY

A structural support apparatus comprises a connection bracket comprising, a generally flat, rigid member having opposing generally flat faces and a thickness extending between the flat faces. The rigid member is attachable to a support member. An arm extends from an end of the rigid member and a finger extends from the arm and is receivable in a hollow channel formed in an attachable member of rigid material. The hollow channel is complementary in configuration to at least one of the finger and the arm and a selected recess configuration is formed between the finger, the arm and the end of the rigid member. The recess accommodates one or more lip portions of the attachable member when either the arm or the finger, are received within the hollow channel.

In a feature, the attachable member comprises a solid body of rigid material formed as a generally rectangular parallelepiped having top and bottom with opposing side and opposing end faces having a selected length, width and thickness respectively. The connection bracket is attachable to a beam of rigid material. The connection bracket is movable within the hollow channel to position the beam with respect to the attachable member and in response to attachment of the connection bracket to the beam, the beam is rigidly attached to the attachable member by pressure of the lip portions of the attachable member on the arm and the finger. The beam comprises a solid body having generally flat top and bottom faces and a thickness extending between the top and bottom faces. One of the opposing generally flat faces of the connection bracket is preferably matable against and attachable to one or the other of the generally flat top and bottom faces of the beam while the arm and the finger of the bracket are received within one or more hollow channels of the attachable member.

In another feature, the attachable member and the connection bracket comprise at least one of, (a) metal, (b) wood, (c) plastic, (d) composite material and (e) glass fiber. One or more generally rectangular hollow channels are formed within the thickness of the channel extending along the attachable member length. The one or more hollow channels are disposed within the solid body of rigid material of which the attachable member is comprised. The apparatus can include at least two attachable members each having a generally rectangular channel formed within the thickness of each of the at least two attachable members. The rectangular channels form a lengthwise lip in each of the two attachable members that are each receivable within one or the other of the pair of recesses formed by the arm and the fingers of the bracket. The rectangular channel forms a lengthwise lip receivable within the recess. The attachable member includes a generally T-shaped channel disposed within the thickness of the body of the attachable member. The generally T-shaped channel is complementary in configuration to recesses formed by the arm and the finger of the bracket such that the arm and the finger of the bracket fit within the generally T-shaped channel.

In a further feature, the arm and the finger and the hollow channel are configured such that the lip portions fit snugly within the recess and the arm is angled with a non-zero angle relative to a plane of the rigid member. The finger is at a non-zero angle of rotation with respect to a plane of the arm or of the rigid member. The arm extends longitudinally from the end of the rigid member and a pair of fingers extend in a flange configuration from the end of the arm. The arm and the fingers form a generally T-shaped extension member and a pair of opposing recesses are formed between the pair of fingers, the arm and the end of the rigid member.

In another feature, the bracket includes one or more clips extending laterally in one direction from at least one of the generally flat faces of the bracket. The one or more clips have a sharp terminal edge that can puncture and extend through a face of a beam and extend into the solid body of the beam upon application of a laterally directed force against a face of the bracket opposing the lateral direction of extension of the one or more clips. In response to insertion of a clip into the body of the beam, the bracket is forced to travel along its longitude by forcible interaction between a surface of the clip and the body of the beam. A lengthwise lip in each of the channels in two attachable members are each receivable within one or the other of the pair of recesses formed by the arm and the fingers of the bracket.

In an additional feature a kit comprises the connection bracket and a machining tool for use in machining rigid material comprising the attachable member to provide the hollow channel complementary in configuration to at least one of the finger and the arm and the selected recess configuration.

BRIEF DESCRIPTION OF THE DRAWINGS

The above and further advantages of the invention may be better understood by referring to the following description in conjunction with the accompanying drawings in which:

FIG. 2A. is a sectional view taken along lines 2-2 of the FIG. 1 assembly showing TShaped bores or channels 90 formed within the medial portion of the body of the planks. FIG. 2B is sectional view taken along lines 2-2 of the FIG. 1 assembly showing side rectangular shaped channels formed with the body of the planks along and at the side edges of the planks, according to invention principles.

DETAILED DESCRIPTION

Figure 1:
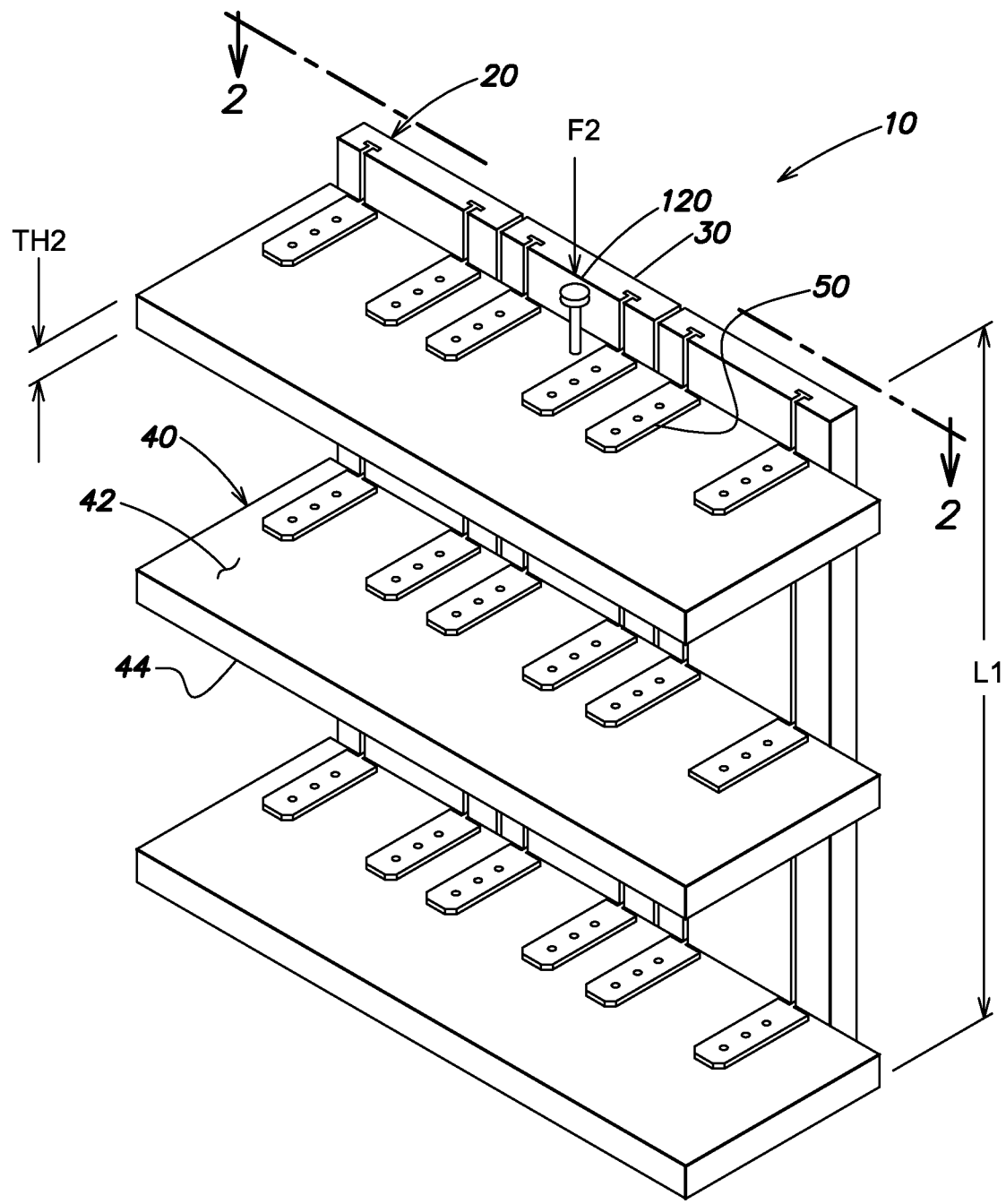
FIG. 1 is a side perspective view of an assembly of attachable members (e.g., planks) and beams fastened together in an end user usable platform configuration by use of brackets, according to invention principles.

A structural support connection bracket comprises, a generally flat, rigid member with an arm extending from the end of the rigid member and a finger extending from the arm with the finger being receivable in a hollow channel formed in an attachable member of rigid material. FIG. 1 shows an assembly 10 employing a connection bracket 50 and forming a structural support apparatus such as an outdoor deck, shelves, flooring, for example, comprised of at least one elongated attachable member (plank) 20 that is comprised of a solid body of rigid material such as wood or plastic. Individual attachable member 20 is formed as a generally rectangular parallelepiped 30 having top 32 and bottom 34 (FIG. 2) and opposing sides 36a, 36b as well as opposing end 38 faces. Member 20 has a selected length L1, width W1 and thickness TH1. The beam 40 has generally flat opposing or parallel top 42 and bottom 44 faces and a thickness TH2 extending between the top bottom faces 42, 44. The attachable member and beam comprise at least one of, (a) metal, (b) wood, (c) plastic, (d) composite material and (e) glass fiber. The connection bracket comprise at least one of, (i) metal, (ii) plastic and (iii) composite material.

Figure 3:
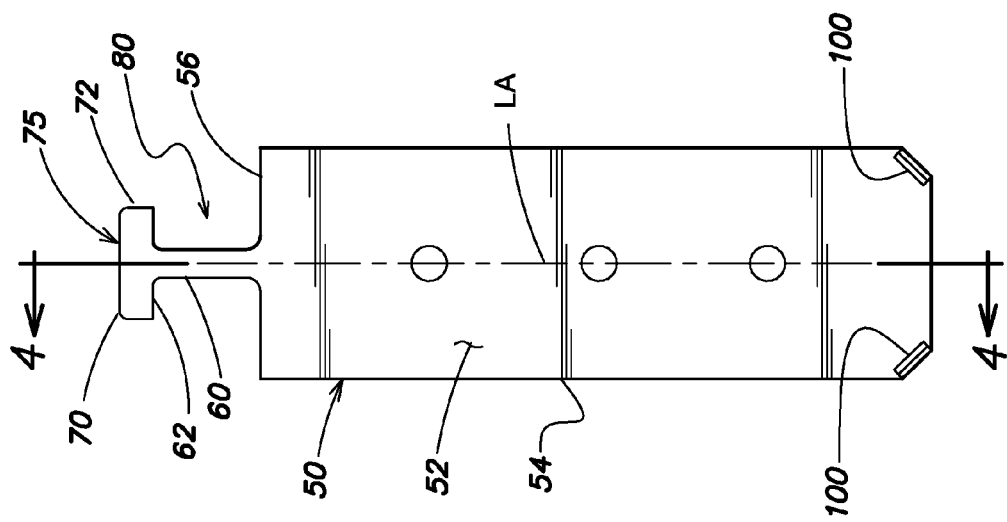
FIG. 3 is a side view of a bracket component of the assembly of FIG. 1, according to invention principles.

As shown in FIG. 1, one of the faces 52, 54 (FIG. 3, 4) of a bracket can be placed in matable engagement with a face 42, 44 of a beam 40 and attached to the beam by conventional attachment means such as a nail or screw 120 driven through the thickness TH3 (FIG. 4) of a bracket into the body of the beam 40 holding the two components 50, 40 together to form the assembly shown in FIG. 1.

Figure 4:
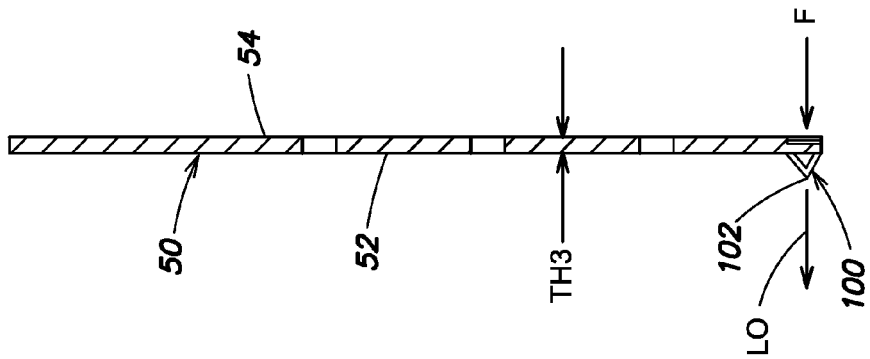
FIG. 4 is a sectional view of the FIG. 3 bracket component taken along a plane 4-4 that extends perpendicularly into the page of FIG. 3 apparatus that intersects longitudinal axis line LA, according to invention principles.

A connection bracket 50 comprises a generally flat, rigid metal plate member having opposing generally flat longitudinal faces 52, 54, FIG. 4, and a thickness TH3 extending between the flat longitudinal faces 52, 54, the plate member 50 having a longitudinal terminal end 56 (FIG. 3) from which extends an arm 60 having a selected arm configuration from which extends a finger 70, 72 having a selected finger configuration. The fingers 70, 72 and the arm are adapted, formed and arranged to form a recess 80 having a selected recess configuration formed between the finger, the arm and the terminal end.

The attachable member 20 has one or more hollow channels 90, 92 (FIG. 2A, 2B) disposed within the solid body of rigid material of which the attachable member 20 is comprised. The one or more channels 90, 92 are adapted and configured to be complementary in configuration to the configuration of one or the other or both of the selected configurations of the arm 60, the fingers 70, 72 and the recesses 80. Thereby, one or the other or both of the finger 70, 72 and the arm 60 of the bracket 50 is receivable within the one or more hollow channels 90, 92. The channels form one or more lip portions 27a, 27b, 29a, 29b in the solid body of the attachable member 20 such that the lip portions 27a, 27b, 29a, 29b are received within the recess 80 of the connection bracket 50 when either the arm 60 or the finger 70, 72 are received within the channel 90, 92.

One of the opposing generally flat longitudinal faces 52, 54 of the connection bracket 50 is preferably matable against, and attachable to, one or the other of the generally flat top and bottom faces 42, 44 of the support beam 40 while the arm 60 and the finger 70, 72 of the bracket 50 are received within the one or more hollow channels 90, 92 of the attachable member 20. The arm 60 and finger 70, 72 of the bracket 50 and the one or more hollow channels 90, 92 of the attachable member 20 are preferably adapted, configured and arranged such that the lip portions 27a, 27b, 29a, 29b formed in the solid body of the attachable member 20 fit snugly within the recess 80 formed by the arm 60 and the finger 70, 72 and the longitudinal terminal end 56 of the bracket 50.

The arm 60 typically extends longitudinally LA (FIG. 3) away from the terminal end 56 of the bracket and a pair of fingers 70, 72 extend in a flange configuration from a longitudinal terminal end 62 of the arm 60. The arm 60 and the fingers 70, 72 form a generally T-shaped extension member 75 from the longitudinal terminal end 56 of the bracket 50, a pair of opposing recesses 80 are formed between the pair of fingers 70, 72, the arm 60 and the longitudinal terminal end 56 of the bracket 50.

The bracket 50 preferably includes one or more clips 100 extending laterally LO (FIG. 4) in one direction outwardly from at least one of the generally flat faces 52, 54 of the bracket 50. The one or more clips 100 being adapted, configured and arranged to have a sharp terminal edge 102 that can puncture and extend through a face 42, 44 of the support beam 40 and extend into the solid body of the support beam 40 upon application of a manually applied laterally directed force F against a face 54, FIG. 4, of the bracket 50 that laterally opposes the lateral direction of extension LO of the one or more clips 100. The one or more clips 100 are typically adapted, configured and arranged such that upon extension of a clip into the body of the support beam 40, the bracket 50 is forced to travel along its longitude LA by forcible interaction between a surface of the clip 100 and the body of the support beam 40.

The attachable member 20 typically has a generally rectangular channel 92 formed within the thickness of the channel extending along the attachable member length L1, FIG. 2B, FIG. 2A. The rectangular channel 92 forms a lengthwise lip 29a or 29b receivable within the recess 80 formed by the arm 60, the finger 70, 72 and the longitudinal terminal end 56 of the bracket 50. The apparatus 10 can include at least two attachable members 20, FIG. 1, FIG. 2B each having a generally rectangular channel 92 formed within the thickness of each of the at least two attachable members 20, 20a (FIG. 2B). The rectangular channels 92 form a lengthwise lip 29a, 29b in each of the two attachable members 20, 20a that are each receivable within one or the other of the pair of recesses 80 formed by the arm 60 and the fingers 70, 72 of the bracket 50.

The attachable member 20 includes a generally T-shaped channel 90 (FIG. 2A) disposed within the thickness of the body of the attachable member and extending the length L1 of the attachable member, FIGS. 1, 2A. The generally T-shaped channel 90 is complementary in configuration to the recesses 80 formed by the arms 60 and the fingers 70, 72 of the bracket 50 such that the generally T-shaped extension member 75 of the bracket 50 fits within the generally T-shaped channel 90 within the body of the attachable member 20.

Figure 5:
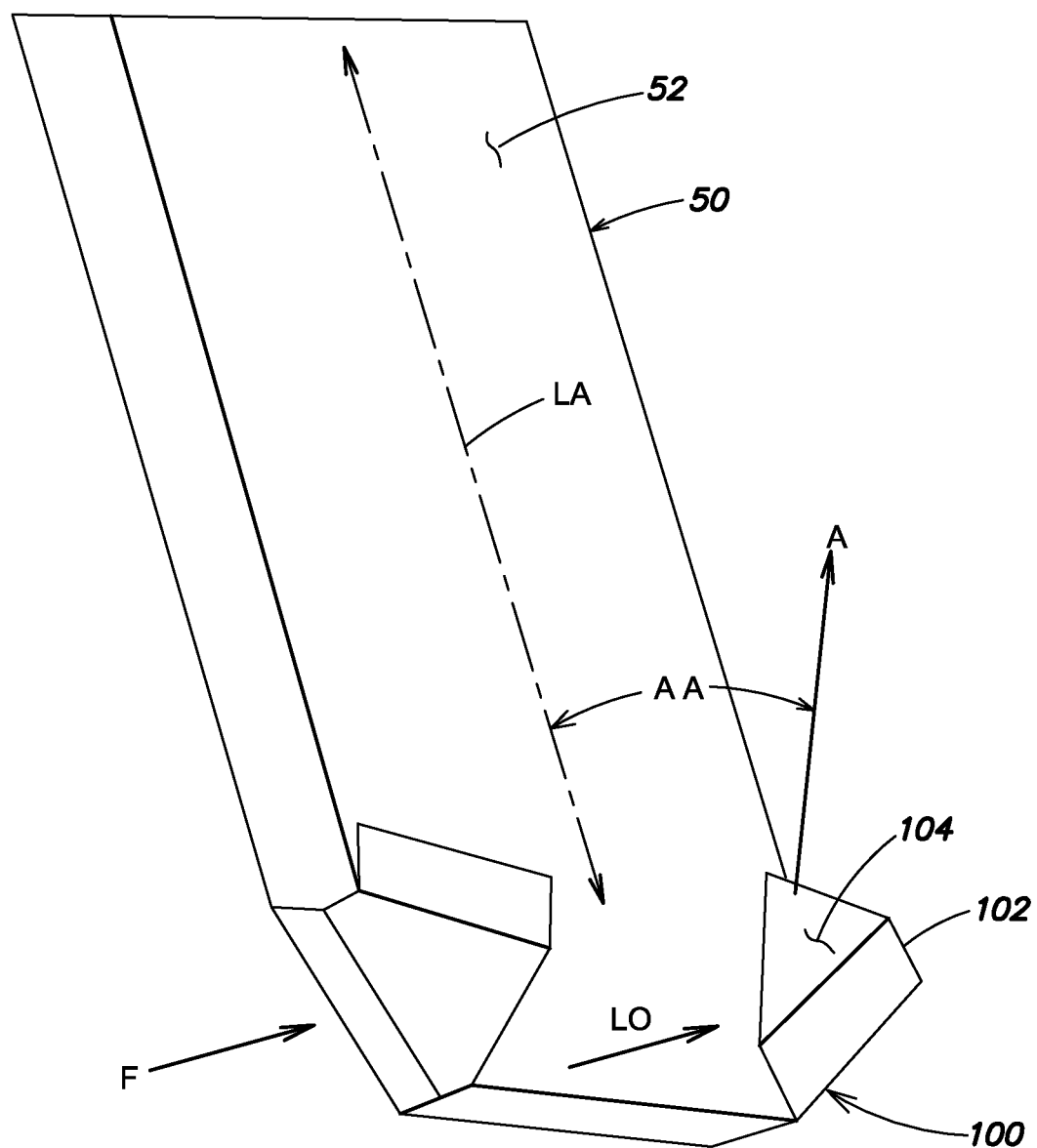
FIG. 5 is a side perspective view of a bracket component of the assembly of FIG. 1 showing the clips element of the bracket, according to invention principles.

As shown in FIG. 5 the clips 100 are configured to have a surface 104 that is arranged along a planar direction A that is oriented at an acute angle AA to the longitudinal axis LA of the bracket 50. This angled orientation of the surface 104 as surface 104 is bored into engagement with the body of support beam 40 by force F, causes the bracket to travel longitudinally LA upon application of force F. As shown in FIG. 5, the clips having a laterally extending LO sharp distal edge 102 that can be driven into the body of the support beam on application of force F serving to assist in attaching the bracket to the beam 40.

Figure 6:
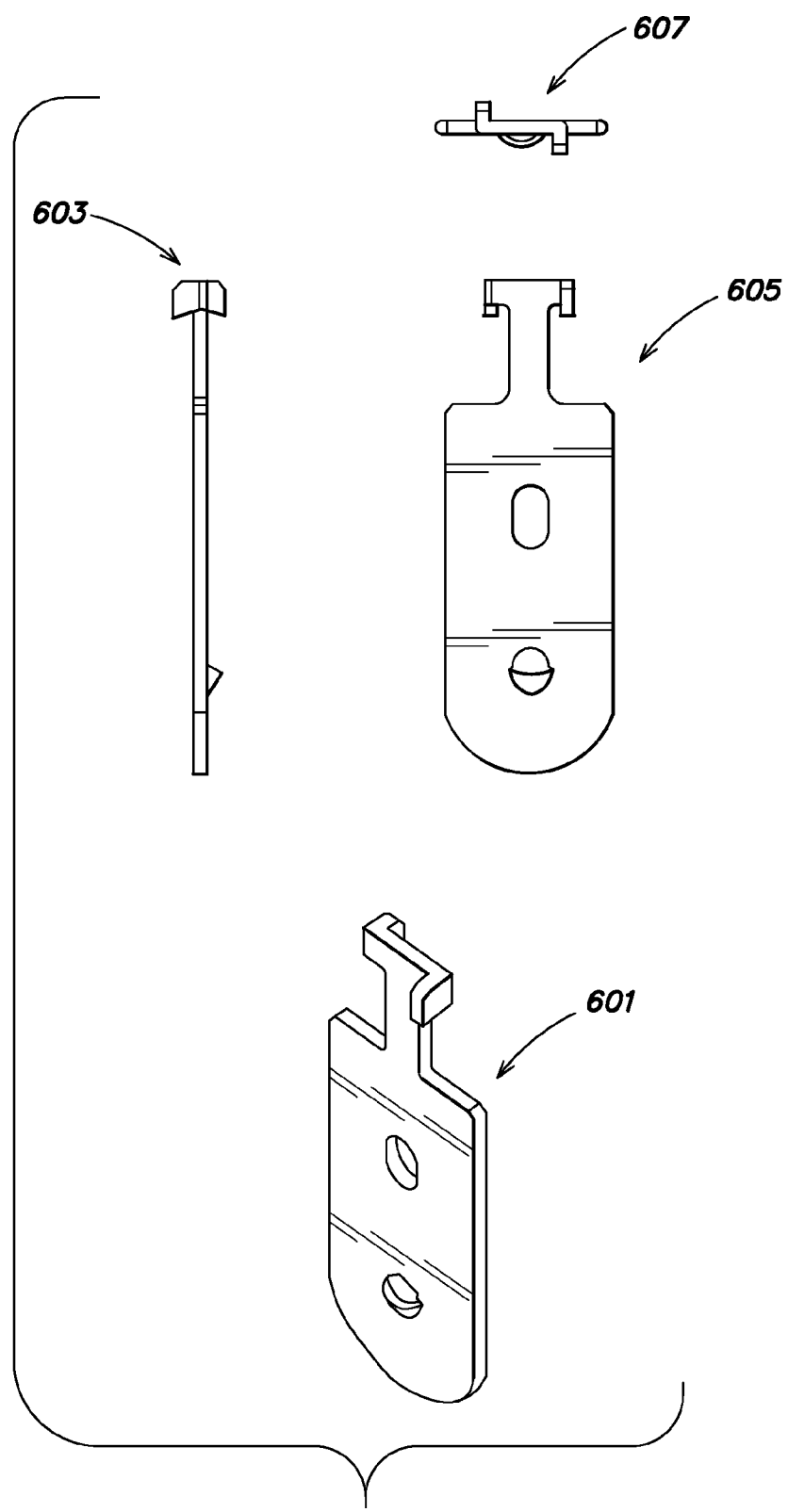
FIG. 6-10 shows additional bracket features facilitating different structural assembly configurations and appearance, according to invention principles.

FIG. 6 shows a connection bracket embodiment in views 601, 603, 605 and 607 presenting a generally flat, rigid member having opposing generally flat faces and a thickness extending between the flat faces where the rigid member is attachable to a support member. An arm extends from an end of the rigid member and a sharp edged finger extends from the arm and is receivable in a hollow channel formed in an attachable member of rigid material. The arm is in the same plane as the rigid member. Upon insertion of a screw through the bracket into a beam, the bracket is forced longitudinally so that the sharp edged finger engages with the hollow channel of the attached member. The hollow channel is complementary in configuration to at least one of the finger and the arm and a selected recess configuration is formed between the finger, the arm and the end of the rigid member. View 601 shows a rotated view of the bracket, view 603 shows the bracket side profile and view 605 shows the bracket planar view indicating a curved lower edge offering enhanced aesthetic appeal for furniture type use, for example. Two screw holes through the bracket are also shown in the planar view with one or more of the holes providing an angled guide for forcing the bracket towards an attachable member upon insertion of the screw through the bracket into a beam. View 607 shows the first bracket top view from the finger end.

Figure 7:
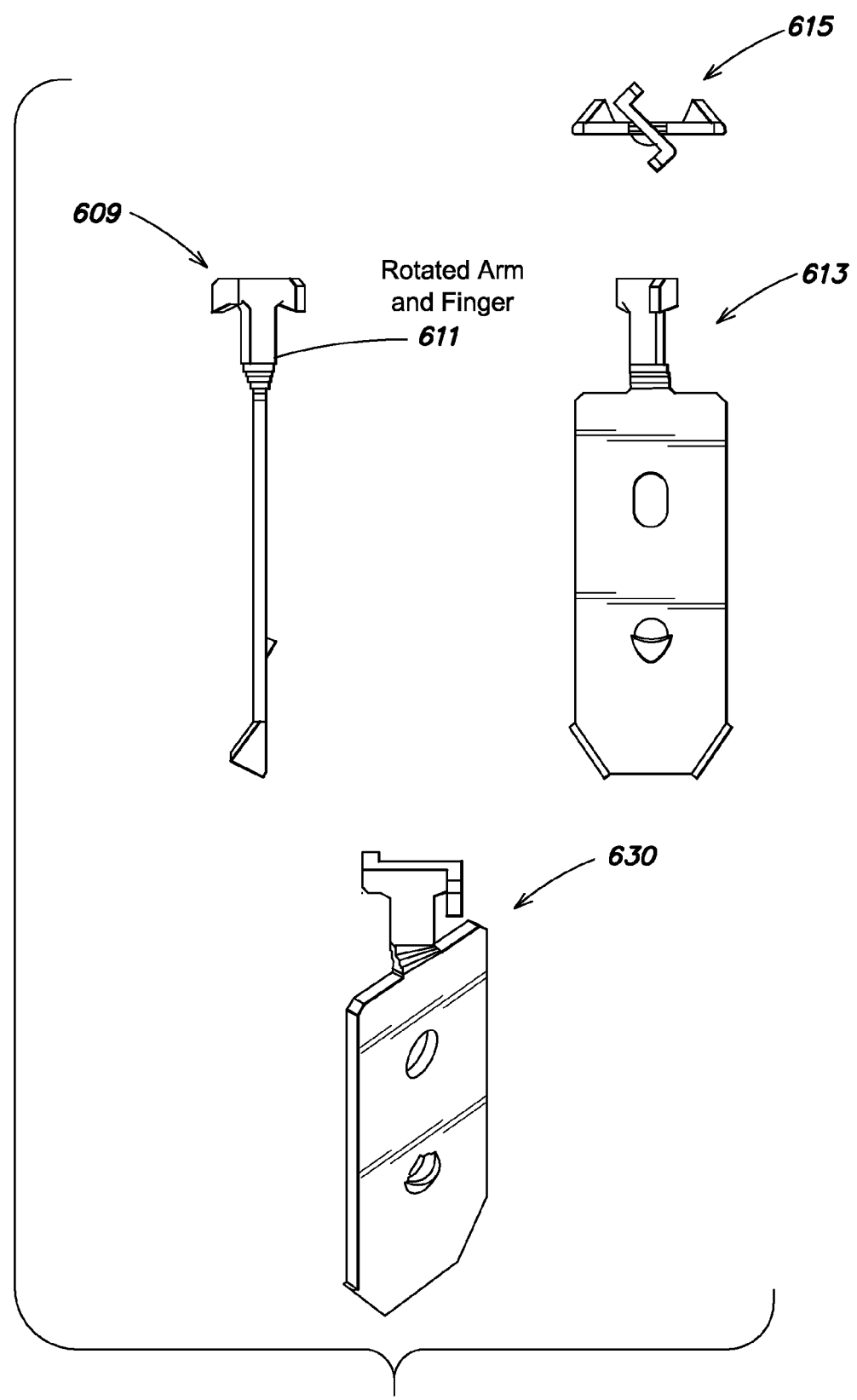

FIG. 7 shows another connection bracket embodiment in views 609, 613, 615 and 630. View 630 shows a rotated view of the bracket, View 609 shows a side profile of the bracket and view 613 shows the bracket planar view. View 609 shows a rotated arm and finger element 611. At least one of the arm and finger elements are rotated with respect to the rigid member. The rotated arm and finger element 611 advantageously enables attaching a member to the bracket in a non-perpendicular arrangement. The angle of rotation may lie in the range 0-90 degrees. View 615 shows the bracket top view from the rotated finger end.

Figure 8:
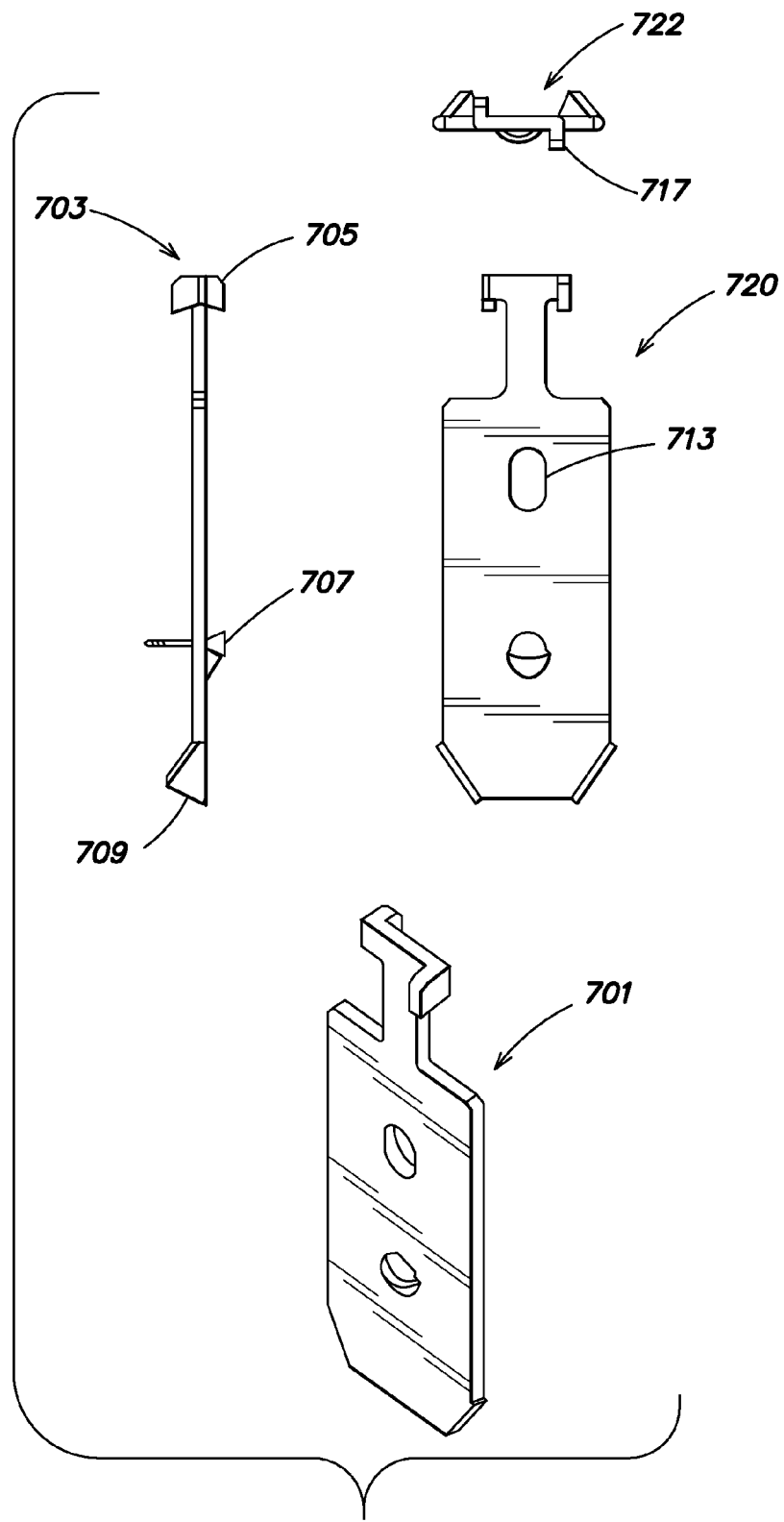

FIG. 8 shows a further connection bracket embodiment in views 701, 703, 720 and 722. View 701 shows a rotated view of the bracket, View 703 shows the bracket side profile illustrating sharp edged fingers 705 that oppose each other and engage with a hollow channel of an attached member to resist movement as further illustrated in fingers 717 of end view 722. Upon insertion of screw 707 through the bracket into a beam until the screw head is flush with the adjacent bracket protrusion as shown in view 703, the bracket is forced longitudinally so that the sharp edged fingers engage with the hollow channel of the attached member. Additional protrusions 709 (one to four or more, for example, with the number adaptively selected in response to type of materials used) dig into the beam to position the bracket for installation and provide a further force in a longitudinal direction through the bracket to the attached member. The protrusions 709 are advantageously angled in an embodiment to provide longitudinal force along the bracket in the direction of the attached member. Planar view 720 of the bracket shows two screw holes with hole 713 comprising an elongated hole available for a second screw if the material requires it.

Figure 9:
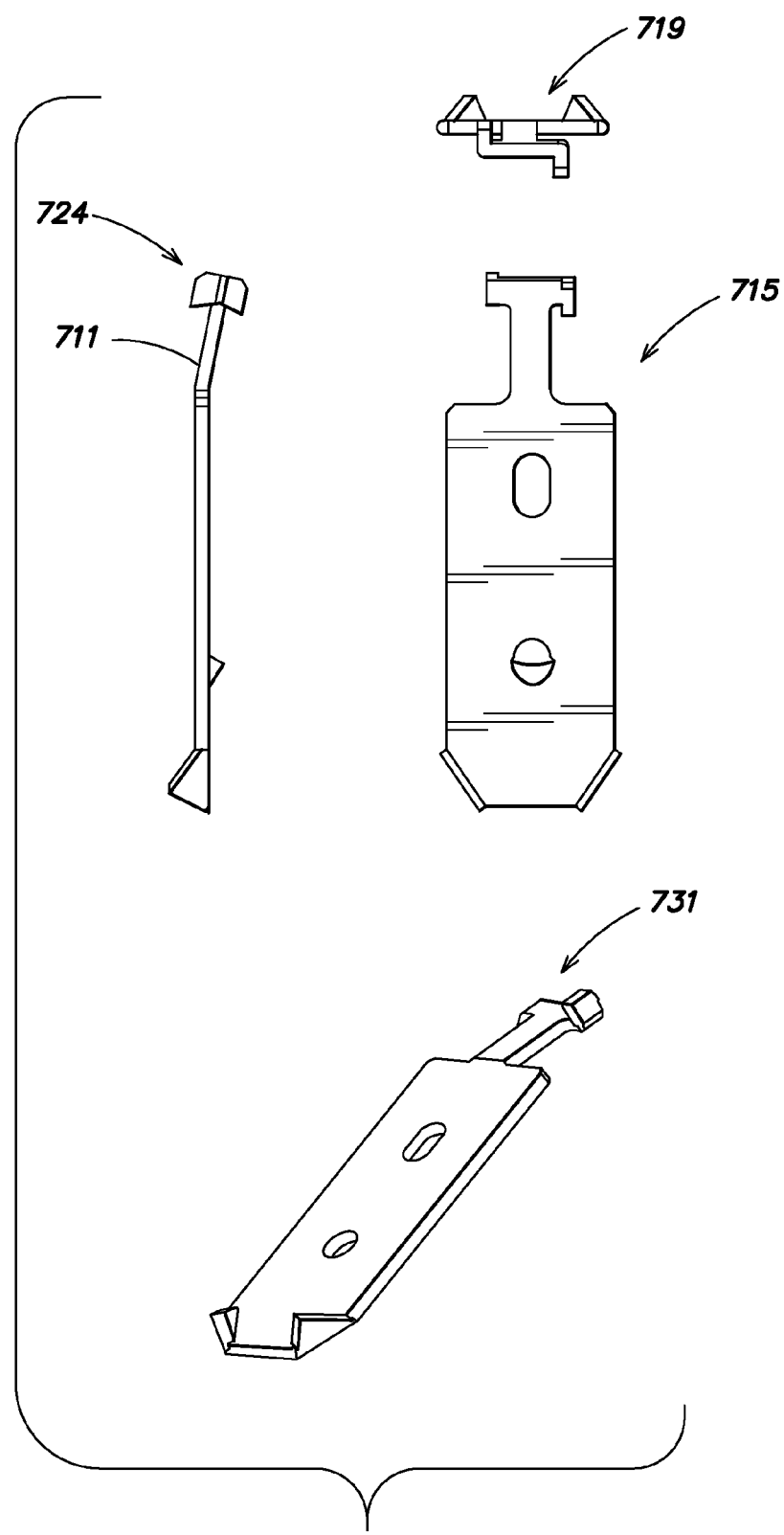

FIG. 9 shows another connection bracket embodiment in views 715, 719, 724 and 731. View 731 shows a rotated view of the bracket, View 724 shows a side profile of the bracket presenting an angled arm and finger arrangement 711 further illustrated in end view 719. The angle provides pre-tensioning of the bracket within a hollow channel of an attached member and enhances resistance between channel and finger-arm and also advantageously provides angular installation of a beam with respect to an attached member. Planar view 715 of the bracket again shows two screw holes as previously described. In one embodiment, he arm is angled with a non-zero angle relative to a plane of the rigid member. In a further embodiment, the finger is at a non-zero angle of rotation with respect to a plane of the arm or of the rigid member.

Figure 10:
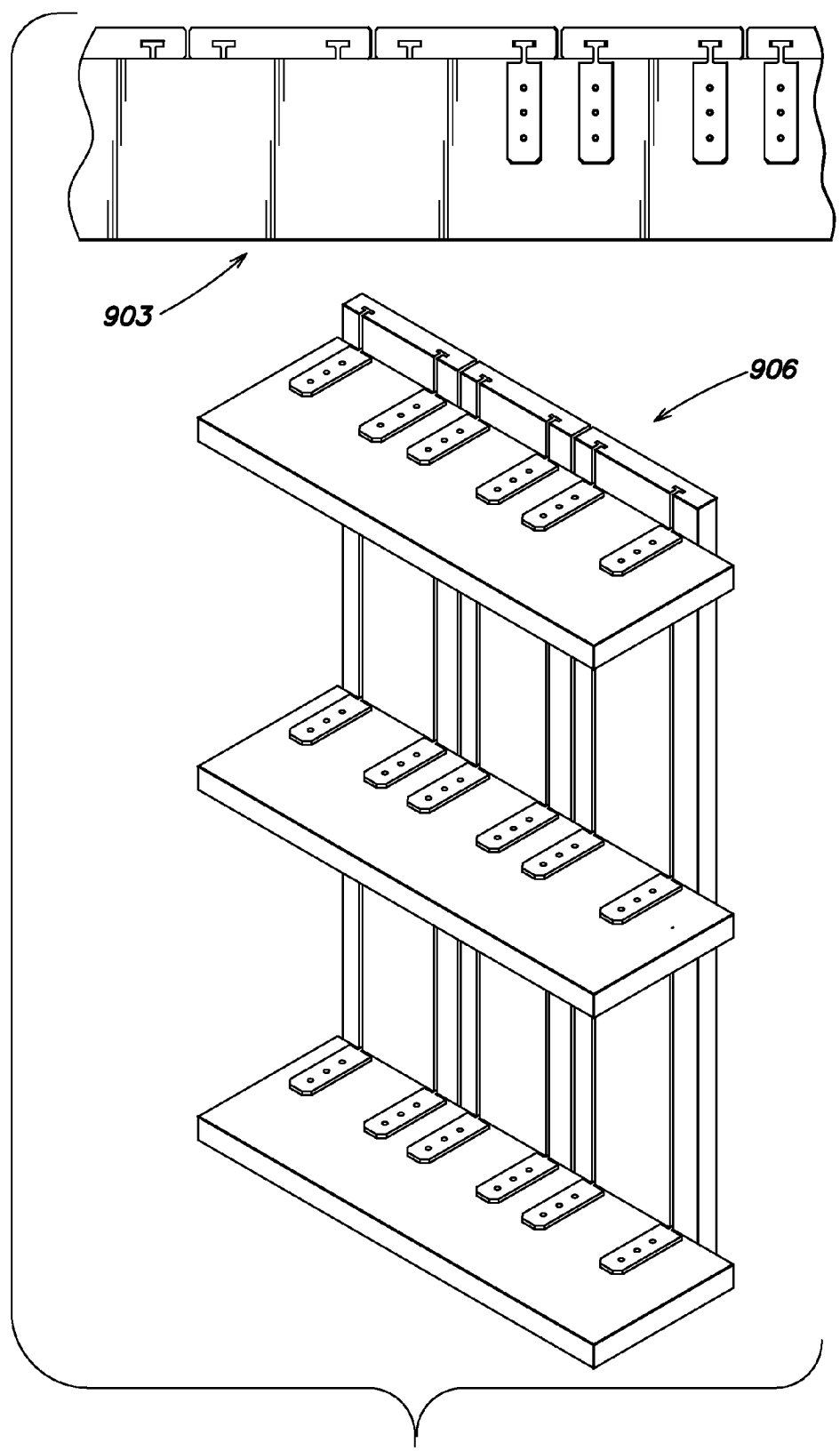

FIG. 10 shows additional views 903 and 906 of a bracket assembly. Specifically, view 903 shows four brackets attached to a beam with the bracket arm and finger elements being incorporated in hollow channels of attached members. View 906 shows three beams coupled to three attached members with each beam being incorporated in hollow channels of attached members using six brackets.

A structural support connection bracket comprises an arm extending from the end of a rigid member and a finger extending from the arm with the finger being receivable in a hollow channel formed in an attachable member of rigid material. The bracket advantageously enables quick secure, flexible assembly of a wide variety of structures, including, flooring, shelves, walls, cupboards, furniture and many more structures. Those of ordinary skill will understand and appreciate the existence of variations, combinations, and equivalents of the specific bracket embodiments and examples herein.

What is claimed is:

1. A structural support apparatus comprising:
   a connection bracket comprising:
   a generally flat, rigid member having opposing generally flat faces and a thickness extending between the flat faces;
   an arm extending from an end of said rigid member; and
   a finger extending from the arm the finger having at least a portion at a non-zero angle of rotation with respect to a plane of the arm;
   an attachable member having a channel formed therein and being defined in part by lip portions defining an opening along a face of the attachable member;
   wherein the finger is receivable in the channel through the opening;
   wherein the channel, opening and lip portions are complementary in configuration to the finger and the arm and a recess defined by the finger, the arm and the end of the rigid member, the recess accommodating the one or more lip portions in the attachable member when the arm and the finger are received within the channel; and
   wherein the arm is angled with a non-zero angle relative to a plane of the rigid member.

2. The structural support apparatus according to claim 1, further comprising:
   a beam of rigid material,
   wherein the connection bracket is movable within the channel to position the beam with respect to the attachable member, and
   wherein in response to attachment of the connection bracket to the beam when the connection bracket is in the channel of the attachable member, the beam is rigidly attached to the attachable member by pressure of the lip portions of attachable member on arm and the finger of the connection bracket.

3. The structural support apparatus according to claim 2 wherein the beam comprises a solid body having top and bottom faces and a thickness extending between said top and bottom faces.

4. The structural support apparatus according to claim 3 wherein one of the opposing generally flat faces of the connection bracket is matable against, and attachable to, one or the other of the generally flat top and bottom faces of the beam while the arm and the finger of the bracket are received within the channel of the attachable member.

5. The structural support apparatus according to claim 1 wherein the attachable member comprises at least one of, (a) metal, (b) wood, (c) plastic, (d) composite material and (e) glass fiber and the connection bracket comprises at least one of, (i) metal, (ii) plastic and (iii) composite material.

6. The structural support apparatus according to claim 1 wherein the arm and the finger and the channel are configured such that the lip portions fit snugly within the recess.

7. The structural support apparatus according to claim 1 wherein the arm extends longitudinally from the end of the rigid member and a pair of fingers extend in a flange configuration from an end of the arm, wherein the arm and the fingers form a generally T-shaped extension member and a pair of opposing recesses are formed between the pair of fingers and the arm and the end of the rigid member.

8. The structural support apparatus according to claim 1 wherein the connection bracket includes one or more clips extending laterally in one direction from at least one of the generally flat faces of the connection bracket, the one or more clips having a sharp terminal edge.

9. The structural support apparatus according to claim 1 wherein the channel in the attachable member has a generally rectangular shape and is formed extending along the face of the attachable member, the rectangular channel forming the lip portions along the attachable member to be receivable within the recess of the connection bracket.

10. The structural support apparatus according to claim 1 wherein the channel of the attachable member comprises a generally T-shaped channel disposed within a thickness of the attachable member, wherein the generally T-shaped channel is complementary in configuration to the recess formed by the arm and the finger of the connection bracket.

11. The structural support apparatus according to claim 1, wherein the finger of the connection bracket comprises a pair of fingers extending from the arm and in opposing directions from a plane of the arm, each finger having at least a portion at a non-zero angle of rotation with respect to a plane of the arm.

12. A kit for a structural support apparatus, comprising:
a. a plurality of connection brackets, wherein each connection bracket comprises:
   a generally flat, rigid member having opposing generally flat faces and a thickness extending between the flat faces;
   an arm extending from an end of the rigid member; and
   a finger extending from the arm, the finger having at least a portion at a non-zero angle of rotation with respect to a plane of the arm;
   wherein the finger and the arm and the end of the rigid member, define a recess,
   wherein the arm, the finger and the recess form a first shape, and
   wherein the arm of at least one of the connection brackets is angled with a non-zero angle relative to a plane of the rigid member; and
b. a machining tool for use in machining a channel in a material, the machining tool having a second shape to form the channel to have a complementary configuration to the first shape defined by the finger and the arm and the recess of one of the connection brackets.

13. The kit according to claim 12, wherein the finger, of at least one of the connection brackets, comprises a pair of fingers extending from the arm and in opposing directions from a plane of the arm, each finger having at least a portion at a non-zero angle of rotation with respect to a plane of the arm.

14. A connection bracket for a structural support apparatus, the structural support apparatus comprising an attachable member having a channel formed along a face of the attachable member, the connection bracket comprising:
   a generally flat, rigid member having opposing generally flat faces and a thickness extending between the flat faces;
   an arm extending from an end of the rigid member; and
   a pair of fingers extending from the arm and in opposing directions from a plane of the arm, each finger having at least a portion at a non-zero angle of rotation with respect to a plane of the arm;
   wherein the pair of fingers and the arm and the end of the rigid member, define a pair of recesses, and wherein the arm, the finger and the pair of recesses form a shape complementary in configuration to the channel in the attachable member, and
   wherein the arm of the connection bracket is angled with a non-zero angle relative to a plane of the rigid member.

15. The connection bracket according to claim 14 wherein the pair of fingers extend in a flange configuration from the end of the arm.

16. The connection bracket according to claim 14 further comprising one or more clips extending laterally in one direction from at least one of the generally flat faces of the bracket, said one or more clips having a sharp terminal edge.

17. The connection bracket according to claim 14, wherein the pair of fingers further comprise sharp edges configured at an end of the finger.

* * * * *